United States Patent [19]
Kubena et al.

[11] Patent Number: 5,905,202
[45] Date of Patent: May 18, 1999

[54] TUNNELING ROTATION SENSOR

[75] Inventors: Randall L. Kubena, Agoura; Gary M. Atkinson, Thousand Oaks; Dorian Challoner, Manhattan Beach; Wallace Sunada, Los Angeles, all of Calif.

[73] Assignee: Hughes Electronics Corporation, El Segundo, Calif.

[21] Appl. No.: 08/977,702

[22] Filed: Nov. 25, 1997

Related U.S. Application Data

[62] Division of application No. 08/522,878, Sep. 1, 1995, Pat. No. 5,756,895.

[51] Int. Cl.$^6$ .......................................................... G01P 9/04
[52] U.S. Cl. .................................... 73/504.15; 73/504.12
[58] Field of Search ........................... 73/504.12, 504.15, 73/504.18, 514.15, 514.16, 514.21, 514.29, 514.36, 510, 862.635

[56] References Cited

U.S. PATENT DOCUMENTS

| | | |
|---|---|---|
| 4,724,318 | 2/1988 | Binnig et al. . |
| 4,806,755 | 2/1989 | Duerig et al. . |
| 5,085,070 | 2/1992 | Miller et al. . |
| 5,209,117 | 5/1993 | Bennett . |
| 5,241,862 | 9/1993 | Abbink . |
| 5,265,470 | 11/1993 | Kaiser . |
| 5,275,047 | 1/1994 | Zabler et al. . |
| 5,285,686 | 2/1994 | Peters . |
| 5,290,102 | 3/1994 | Kaiser et al. . |
| 5,293,781 | 3/1994 | Kaiser et al. . |
| 5,315,247 | 5/1994 | Kaiser et al. . |
| 5,377,545 | 1/1995 | Norling . |
| 5,431,051 | 7/1995 | Biebl et al. . |
| 5,438,870 | 8/1995 | Zalbler et al. . |
| 5,596,194 | 1/1997 | Kubena . |
| 5,756,895 | 5/1998 | Kubena .................................. 73/504.15 |

FOREIGN PATENT DOCUMENTS

| | | |
|---|---|---|
| 0 619 494 | 10/1994 | European Pat. Off. . |
| 40 32 559 | 4/1992 | Germany . |
| 59 171141 | 1/1985 | Japan . |
| 03 101127 | 4/1991 | Japan . |
| 40 4369418 | 12/1992 | Japan . |

OTHER PUBLICATIONS

Benecke, W., et al "*Micro Electrto Mechanical Systems*" US, New York, IEEE, Feb. 4–7, 1992, pp. 214–219.

Kenny, T.W., et al. "*Micromachined tunneling displacement transducers for physical sensors*" Journal of Vacuum Science & Technology, Jul./Aug., 1993, pp. 797–802. v. 11, No. 4.

Kaiser, J.W., et al. "*Tunnel–Effect Displacement Sensor*" NTIS Tech Notes, Apr., 1990.

*Primary Examiner*—Christine K. Oda
*Attorney, Agent, or Firm*—V. D. Duraiswamy; M. W. Sales

[57] ABSTRACT

Various structures for cantilever beam tunneling rate gyro devices formed on a single substrate are disclosed. A cantilever electrode having a plurality of portions extending from the substrate with one end of the cantilever is suspended above the substrate at a distance from a tunneling electrode so that a tunneling current flows through the cantilever and tunneling electrode in response to an applied bias voltage. The cantilever and tunneling electrodes form a circuit that produces an output signal. A force applied to the sensor urges the cantilever electrode to deflect relative to the tunneling electrode to modulate the output signal. The output signal is a control voltage that is applied between the cantilever electrode and a control electrode to maintain a constant tunneling current. In the preferred embodiment, two cantilever portions extend from the wafer surface forming a Y-shape. In a further embodiment, a strap is fabricated on the cantilever electrode. In an alternate embodiment, a ridge emitter is formed such that it remains under the cantilever electrode during lateral motion of the cantilever. In an alternate embodiment, a cantilever having a varying width is fabricated.

4 Claims, 3 Drawing Sheets

TUNNELING ROTATION SENSOR

This is a division of application with Ser. No. 08/522,878 filed on Sep. 1, 1995, U.S. Pat. No. 5,756,895.

BACKGROUND OF THE INVENTION

1. Field of the Invention

The present invention generally relates to the field of micro- electromechanical (MEM) sensors for measuring an applied force, and more specifically to a tunneling rate based gyro.

2. Description of the Related Art

One method for sensing physical quantities such as linear acceleration or rotation, or acoustic or hydrophonic pressure is to provide a flexible member that flexes in response to an applied force and measures the amount of flex electrically. Conventional micro-mechanical techniques for achieving the transduction include capacitive coupling, piezoresistive and piezoelectric sensing. However, none of these techniques are inherently as sensitive as tunneling tip transduction.

In tunneling tip sensors, a bias voltage is applied across a flexible counter electrode and a tunneling tip with a sufficiently small gap between the two components to induce a tunneling current to flow. The tunneling current $I_T$ is given by: $I_T\ V_B \exp(-\alpha h \sqrt{\phi})$, where $V_B$ is the bias voltage, $\alpha$ is a constant, h is the electrode-to-tip separation and $\phi$ is the work function. As the applied force changes, the separation between the electrode and the tip changes and modulates the tunneling current, which varies by approximately a factor of two for each angstrom (Å) of electrode deflection. Tunneling currents are typically 1nA and the current noise is typically $10^{-13}$ A per square root hertz. Thus, tunneling tip detectors can provide a much greater sensitivity and a larger bandwidth than previous method of detections and still provide easily measurable signals.

For the specific application of a tunneling tip sensor as an accelerometer, the deflection distance x=ma/k, where m is the electrode's mass, k is the electrode's spring constant and a is the acceleration. The effective bandwidth of the accelerometer is determined by its resonant frequency.

$$w = \sqrt{\frac{k}{m}}.$$

Since tunneling tip techniques are more sensitive to deflection, the accelerometer's mass can be relatively small, and thus its bandwidth can be larger than the capacitive coupling and piezoresistive devices.

A single cantilever beam and a dual-tine cantilever rotational sensor and fabrication method are disclosed in a co-pending application by similar inventors, and entitled "Single Wafer Tunneling Sensor and Low Cost IC Manufacturing Method." A single cantilever beam rotational sensor includes a z-axis sensor and a control circuit. In addition, a single lateral control electrode is disposed adjacent to the cantilever electrode of the sensor. The lateral control electrode is modulated with a voltage to induce a lateral vibration at a known maximum velocity $V_1$. The sensor measures the Corichlis force $F_c$ given by: $F_c = \frac{1}{2} * m * W_r \times V_1$ where m is the cantilever electrode's mass, $W_r$ is the rotational rate and $V_1$ is the cantilever electrode's lateral velocity. The rotational rate can be determined by measuring the Coriolis force, which is directly proportional to the rotation.

Although this single cantilever beam gyro provides a more sensitive and compact sensor than the other conventional rotational sensors, its structure has deficiencies. For example, linear accelerations can produce additional deflections of the cantilever electrode, causing fluctuations is the tunneling current and therefore incorrect estimates of the rotational rate. In addition, constant tunneling current cannot be guaranteed with a single cantilever beam located over a tunneling tip electrode. For large lateral excursions of the cantilever, the tunneling current between the cantilever electrode and the tunneling tip would be lost.

In addition to the single beam, surface micromachined, z-axis rotational sensor, the co-pending application discloses a rotational sensor which is insensitive to linear acceleration forces. A double-ended tuning fork is suspended above and parallel to a substrate by a cross-beam which is supported at its ends by two posts and is orthogonal to the tuning fork. One end of the tuning fork forks into a pair of cantilever beams which are positioned parallel to a rotation axis and have associated lateral control electrodes. The other end of the tuning fork forks into a pair of cantilever electrodes which are suspended above respective control electrodes and tunneling tip electrodes. The tunneling tip electrodes are connected to control circuits to maintain constant tunneling currents. The forked ends are interconnected by a cantilever member which is attaiched to the cross-beam.

The voltages applied to the lateral electrodes are modulated in synchronism such that their cantilever beams move 180° out of phase with one another in the plane of the substrate. As the sensor rotates around its axis, equal but opposite z-axis Coriolis forces are applied to the respective cantilever beams to move them perpendicular to the surface of the wafer, producing a torque on the cantilever member proportional to the Coriolis force. The torque tries to deflect the cantilever electrodes but is opposed by the feedback circuitry. The rotational rate can be determined by taking the difference between the respective outputs. By oscillating the cantilever beams 180° out of phase with one another, the changes in the positions of both cantilevers due to linear accelerations are subtracted out and do not affect the rotation signal. Although this double-ended tuning fork configuration improves performance by separating the sensor fork from the drive fork thereby reducing the noise in the rotation signal, its fabrication method and structure have several deficiencies. A robust design requires that the dual double-ended tuning fork be firmly attached to the cross-beam by adding capping material at the junction, thus requiring additional processing steps. The complex device geometry leads to the generation of many eigenmodes near the drive and sense frequencies. This reduces the effective bandwidth of the gyro device. For the double-ended tuning fork devices, additional control loops are required to electronically damp these oscillations if they are excited. These additional eigenmodes can urge the cantilever electrode beyond the tunneling electrode so that the tunneling signal is lost part of the time.

One advantage of the double cantilever design is that by driving the two tines out of phase 180°, linear accelerations can be rejected. However, these linear accelerations must occur at precisely the same frequency and phase as the lateral control electrode drive signals to the gyro in order to interfere with the rotational signals. By designing simple mechanical structures whose fundamental modes have frequencies far beyond that which occurs in the sensor's environment, these linear accelerations will not create error signals.

SUMMARY OF THE INVENTION

The present invention seeks to provide surface micromachined (as opposed to bulk micromachined) tunneling rate based gyro devices which result in simple device geometries, fundamental modes at drive and sense frequencies, no extraneous modes near the fundamentals, increased effective band-width, low temperature coefficients, continuous monitoring of tunneling current during operation, and reduced high frequency "noise" on the signal. Surface micromachining provides a low cost, high yield, process for manufacturing since it is inherently compatible with integrated circuit (IC) fabrication.

These goals are achieved with a tunneling rate based gyro that has a unitary structure and is formed on a single substrate of any material, preferably semiconductor. In the preferred embodiment, two portions of a cantilever electrode extend from a semiconductor substrate over a tunneling electrode. These two cantilever electrode portions which extend from the semiconductor wafer join one another over the substrate forming a Y-shape. The cantilever is positioned over the tunneling electrode such that where the two portions extending from the substrate meet is where the tunneling electrode is placed. The cantilever is suspended above the substrate at a distance from the tunneling electrode such that a tunneling current flows between the cantilever and the tunneling electrode. This current flows in response to a bias voltage which is applied across the cantilever electrode and the tunneling electrode. The cantilever electrode and the tunneling electrode form a circuit that produces an output signal such than an applied force which urges the cantilever electrodes to deflect relative to the tunneling electrode modulates said output signal. In the preferred embodiment, the tunneling electrode is located below the cantilever where the first portion and the second portion of the cantilever electrode join one another. This portion of the cantilever is a node for the lateral motion, and virtually no motion occurs between the bottom of the cantilever and the tunneling electrode at this point.

In another embodiment, a cantilever is positioned over a ridge-emitter tunneling electrode. In another embodiment, a cantilever having a varying width is fabricated which reduces the lateral movement of the cantilever over the tunneling electrode. In another embodiment, a cantilever electrode is fabricated having a cantilever strap which restricts the movement of the center section of the cantilever above the tunneling electrode.

In each of the embodiments, lateral control electrodes are fabricated to produce a lateral motion of the cantilever electrode such that the sensor detects a rotation. The lateral control electrodes produce lateral forces that oscillate the cantilever electrode in response to a corresponding oscillating voltage across the lateral control electrodes and cantilever electrode. When the sensor is rotated about an axis parallel to the cantilever electrode, the applied force is proportional to the rotational rate.

In a further embodiment, a 3-D inertial cube sensor includes a z-axis accelerometer and a rate-based gyro formed on three mutually orthogonal faces to provide x-y-z linear accelerations and gyros.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
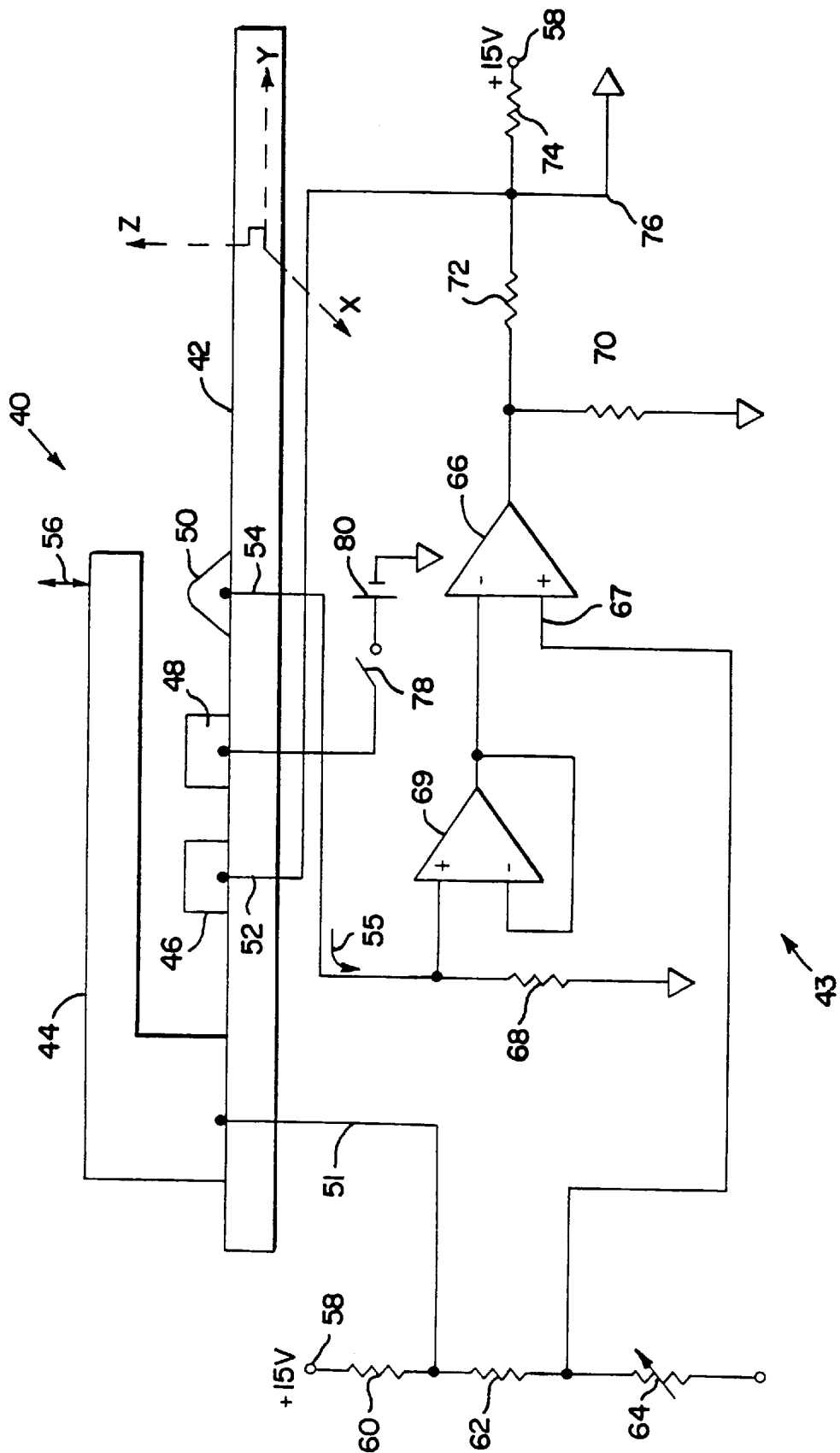
FIG. 1 is a sectional view of a z-axis tunneling sensor without lateral control electrodes including a schematic diagram of an analog feedback circuit.

FIG. 1 shows a sectional view of a z-axis tunneling tip sensor 40 without lateral control electrodes together with an analog feedback circuit 43 which is one type of circuit that can be used to control the sensor's operation. The z-axis tunneling tip sensor can be fabricated on a semiconductor wafer 42 that lies in the plane defined by the x and y axes.

Circuit 43 applies a control voltage via leads 51 and 52 across the cantilever electrode 44 and the control electrode 46 to create an attractive electric field which pulls the cantilever down to a reference position close to the tunneling tip, e.g., 1–2 nm away from the tip. The circuit also applies a bias voltage via leads 51 and 54 across the cantilever electrode and tip sufficient to initiate a flow of tunneling current 55 through them. The circuit is designed to respond to a deflection of cantilever arm 44 by modulating the control voltage while holding the tunneling current constant, so that the value of the control voltage at any given time indicates the degree of cantilever arm flexure. Alternatively, the control voltage could be held constant and tunneling current modulated, or a combination of both approaches could be used, but modulating the control voltages makes the device less susceptible to damage and effectively linearizes the output signal.

In circuit 43 a supply voltage is applied via a reference terminal 58 across a series connection of resistor 60, 62 and a variable resistor 64, preferably 1 MΩ, 10 kΩ and nominally 2 kΩ to ground reference potential. The cantilever electrode 44 is electrically connected to the junction of resistors 60 and 62, and the junction of resistors 62 and 64 is connected to the non-inverting input 67 of an operational amplified 66 to provide a reference voltage. The tunneling electrode 50 is connected through an input resistor 68 to ground reference potential, and is is also connected to the non-inverting input of an operational amplifier 69. The amplifier 69 is connected as a voltage follower, with its output connected to amplifier 66's inverting input. The output of amplifier 66 is connected through a resistor 70, preferably 10 kΩ, to ground potential and through a series connection of resistors 72 and 74, preferably 4 MΩ and 1 MΩ, to the supply potential terminal 58. The junction of resistors 72 and 74 is electrically connected to control electrode 46 via line 52 to provide the control voltage, which is monitored at output node 76 and is generally proportional to an applied force 56. The value of resistor 64 is selected to establish a reference value of tunneling current, preferably 1nA.

The applied force 56, which may be due for example to an acceleration or coriolis force due to rotation for gyros, tends to deflect the cantilever arm. This initially alters the tunneling current 55 and produces unbalanced differential inputs for amplifier 66. The amplifier responds by modulating the control voltage on lead 52 to produce an opposing force to the applied force, thus maintaining a constant cantilever-to-tunneling electrode separation and a constant tunneling current 55. If the applied force causes the cantilever to bend upwards, the separation increases and the tunneling current decreases such that the voltage at the non-inverting input of amplifier 66 is more than the voltage at its inverting input. The amplifier's output is positive, and thus increases the control voltage and the attractive force on the cantilever arm to bring it back to the reference position. Conversely, if the force tends to deflect the cantilever arm downwards, the tunneling current increases and the amplifier's output goes negative, thus reducing the attractive force and allowing the cantilever spring to pull itself back to the reference position. Without its feedback circuit, the cantilever arm can deflect excessively and damage the tunneling electrode. Furthermore, in the absence of a feedback circuit the sensor's output would be linear only over very small deflections.

The sensor 40 is calibrated periodically by closing a switch 78 to apply a known voltage from a DC source 80 to the test electrode 48 to simulate an applied force, and measuring the resulting output (calibration) voltage. In normal operation, the output would be scaled by the calibration response to produce a normalized output that compensates for drifts in the sensor performance caused by temperature changes, component aging and the like. Each of the gyros described may use this type of circuit for its operation.

Figure 2:
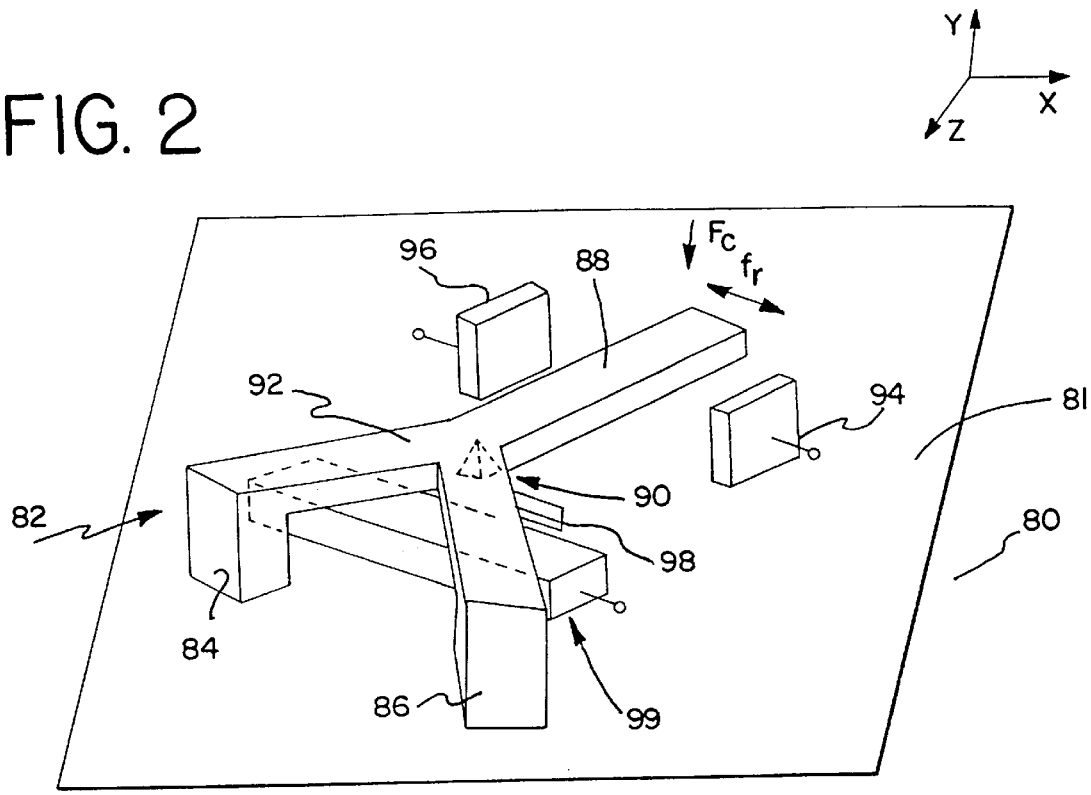
FIG. 2 is a perspective view of a rate-based gyro Y-shape design.

FIG. 2 shows a perspective view of a Y-shape rate-based gyro 82 that lies in the x-y plane and extends therefrom. In FIG. 2, a first portion 84 and a second portion 86 of the cantilever electrode 88 are affixed to the wafer 80. The cantilever 88 is suspended approximately 1 to 2 microns above the surface 81 of the wafer 80 which may contain a control electrode 99, a test electrode 98, position or velocity sense electrodes 94,96 and tunneling electrode 90. The gyros which are shown in FIGS. 2 through 5 and the 3-D inertial cube shown in FIG. 6 may be operated with the control circuit 43 as disclosed in FIG. 1. In FIG. 2, the cantilever electrode 88 extends over the surface 81 of the wafer 80 and over the tunneling electrode 90. The first portion 84 and the second portion 86 of the cantilever electrode 88 join one another 92 over the wafer 80. Preferably, cantilever portions 84 and 86 join to form a Y-shape over the surface 81 of the wafer 80 and a tunneling electrode 90 is positioned underneath the point 92 where this Y-shape is formed. In the preferred embodiment, this tunneling electrode 90 is a tunneling tip.

A test or calibration electrode 98 is also fabricated on the wafer surface 81. The calibration electrode 98 is located below the cantilever 88 and adjacent the control electrode 99. The test electrode 98 applies a test force to the cantilever. This test force produces a calibration current in response to this voltage across the calibration electrode 98 and the cantilever electrode 88.

A first lateral control electrode 94 and a second lateral control electrode 96 are placed adjacent to the cantilever electrode 88. For each of the cantilever structures disclosed in FIGS. 2 through 5, the same type of lateral control electrodes 94,96 are disposed adjacent the cantilever electrode of the sensor. The lateral control electrodes 94,96 are modulated in synchronism with a voltage to induce a lateral vibration at a known maximum velocity V1 in the cantilever electrode. The lateral control electrodes 94,96 drive the cantilever electrode at the lateral resonant frequencies of the cantilever electrode. The first and second lateral control electrodes (94 and 96, respectively) produce lateral forces which oscillate the cantilever electrode in response to a corresponding oscillating voltage across the lateral control electrodes 94,96 and cantilever electrode. When the sensor is rotated about an axis parallel to the cantilever electrode the applied force is proportional to the rotational rate. The two lateral control electrodes 94,96 are driven 180 degrees out of phase such that the voltages applied to the respective lateral electrodes 94,96 are modulated in synchronism and the cantilever electrode is driven in the lateral direction. By driving the cantilever electrode in the lateral direction, the gyro can sense the Coriolis forces Fc in the vertical direction. The Coriolis force Fc given by $Fc = \frac{1}{2} * m * W * V$ where m is the cantilever electrode's lateral velocity. The rotational rate can be determined by measuring the Coriolis force, which is directly proportional to the rotation.

In FIG. 1, the essential features of this design are that a simple surface micromachined process can be used to fabricate the tunneling tip 90 and cantilever 88 on a single semiconductor wafer 80. The tunneling tip 90 is located under a node (which is stationary) for lateral vibrations of the cantilever 88 so that tunneling current is always maintained with low noise regardless of the amplitude of the lateral vibration. Additionally, there are no extraneous modes of the cantilever 88 located near the fundamental lateral and vertical modes.

In FIGS. 2–5, the position of the lateral control electrodes 94,96 adjacent the cantilever will vary as the device structure varies. Preferably, the lateral control electrodes 94,96 have been placed approximately ten percent of the overall length of the cantilever electrode away from the cantilever. In the preferred embodiments, the width of the lateral control electrodes 94,96 have been approximately ten percent of the overall length of the cantilever electrode.

For example, for a cantilever electrode with a length of 250 microns, lateral control electrodes 94,96 having a width of approximately 25 microns are placed approximately 25 microns from the end of the cantilever electrode. The amplitude of the lateral motion of the cantilever can be detected by a high frequency capacitance sense circuit whose signal can be superimposed on the drive electrodes or additional sense electrodes placed near the drive electrodes can be easily added.

Figure 3:
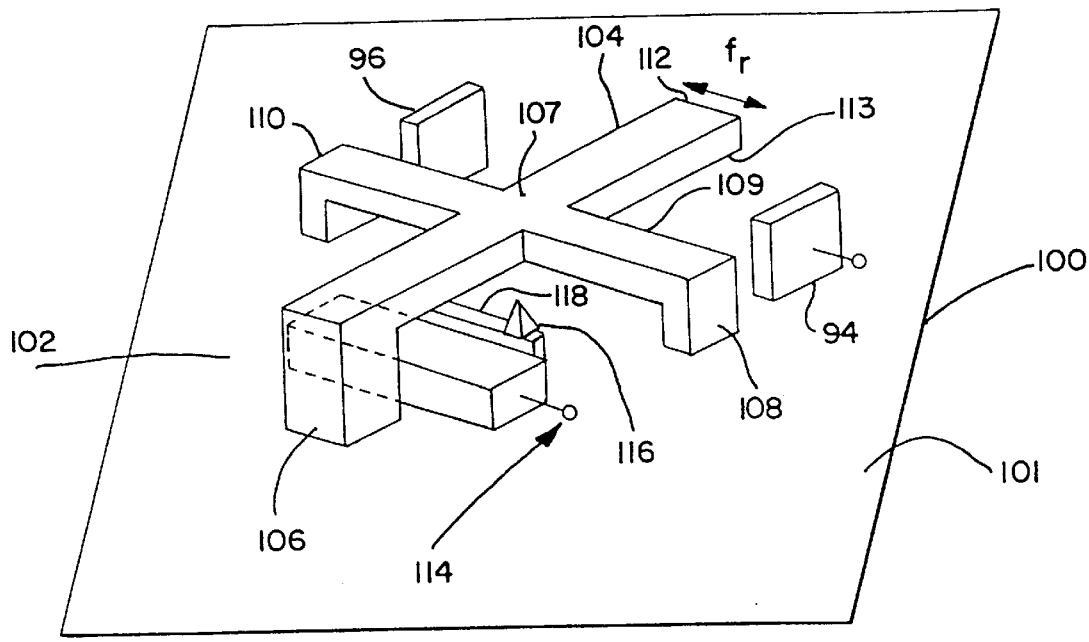
FIG. 3 is a perspective view of a rate-based gyro having a cantilever strap.

FIG. 3 is a perspective view of a rate-based gyro having a cantilever strap 102. This gyro 102 is formed on a semiconductor wafer 100. This gyro can be operated via a control circuit which is essentially the same as the circuit 43 of FIG. 1. The cantilever electrode 104 extends over the surface 101 of the wafer 100 and over the tunneling electrode 116. Three portions of the cantilever 106,108 and 110 extend from the surface 101 of the wafer 100. Cantilever electrode portions 108 and 110 extend from the wafer surface 101 and intersect the cantilever electrode 104. Portions 108 and 110 form the cantilever strap 109.

A control electrode 114 is formed adjacent to the first cantilever portion 106. A test or calibration electrode 118 is also fabricated on the wafer surface 101. The test electrode 118 is located below the cantilever 104 and adjacent the control electrode 114. This test electrode 118 functions similarly as the test electrode 98 described in FIG. 2. In this preferred embodiment, a tunneling electrode 116 is situated below the intersection 107 of the cantilever strap 109 and the cantilever electrode 104. In an alternative embodiment, this tunneling electrode 116 could be manufactured underneath the cantilever strap 109. In alternative cantilever strap embodiments, the strap 109 may be placed anywhere on the cantilever electrode 104. In the preferred embodiment, the cantilever strap 109 is positioned laterally in the center of the cantilever 104.

Two lateral control electrodes 94 and 96 are disposed adjacent the cantilever electrode 104. These lateral control electrodes 94,96 are operated in the same fashion as the lateral control electrodes 94,96 described in FIG. 2. In this preferred embodiment, the lateral control electrodes 94 and 96 are placed near the end 112 of the cantilever electrode 104. In the cantilever strap embodiment 102, linear accelerations and the laterally induced velocity by the lateral control electrodes 94,96 produce additional deflections of the cantilever electrode 104. However, because the tunneling electrode 116, which in this preferred embodiment is a tunneling tip, is positioned under the cantilever strap 109 of the cantilever electrode 1041, lateral excursions of the cantilever electrode 104 will not result in the loss of rotational sensitivity (i.e. extra noise due to surface roughness on the underside 113 of the cantilever electrode 104 or loss of signal due to a large amplitude of lateral vibration). As measured in the preferred embodiment Y-shape rate based gyro 82, the cantilever strap gyro 102 measures a Coriolis force Fc given by Fc=½*m*W*V where m is the cantilever electrode's 104 lateral velocity. The rotational rate can be determined by measuring the Coriolis force, which is directly proportional to the rotation.

Figure 4:
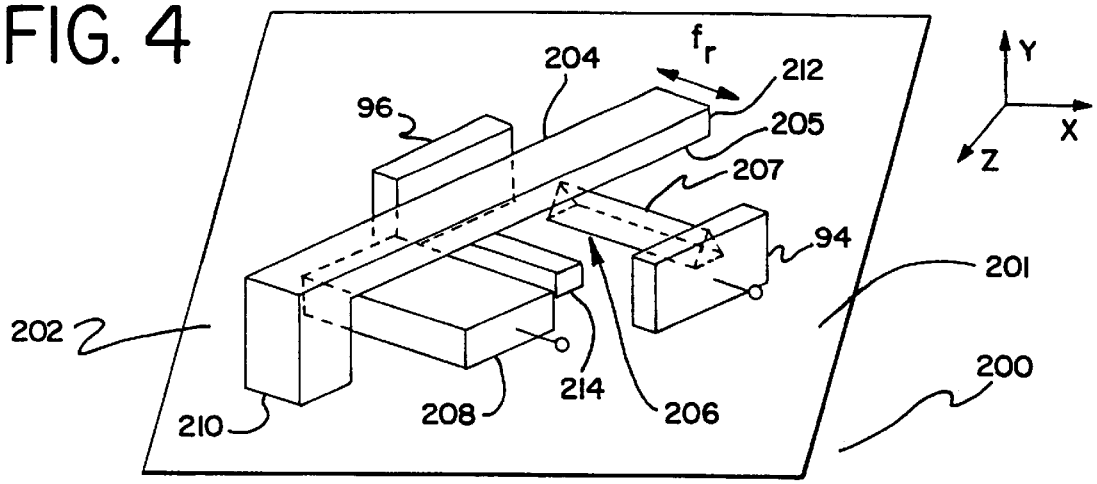
FIG. 4 is a perspective view of a rate-based gyro having a ridge emitter.

FIG. 4 is a perspective view of a ridge-emitter rate-based gyro 202. The sensor 202 is formed on a the surface 201 of semiconductor wafer 200. A cantilever portion 210 extends from the wafer surface 201. The cantilever electrode 204 extends over the ridge emitter 206. A ridge emitter 206 is disposed underneath the cantilever electrode 204, with a separation of approximately 1–2 microns between the ridge emitter tip 207 and the underside 205 of cantilever electrode 204. A control electrode 208 is formed adjacent to the cantilever portion 210. A test or calibration electrode 214 is also fabricated on the wafer surface 201. The test electrode 214 is located below the cantilever electrode 204 and adjacent the control electrode 208. This test electrode 214 functions similarly as the test electrode 114 described in FIG. 2.

In FIG. 4, the two lateral control electrodes 94,96 are disposed adjacent the cantilever electrode 204. These lateral controls are operated in the same fashion as the lateral control electrodes 94,96 described in FIG. 2. In this preferred embodiment, the lateral control electrodes 94,96 are placed near the end 212 of the cantilever electrode 204. As measured in the preferred embodiment Y-shape gyro 82, the ridge-emitter gyro 202 measures a Coriolis force Fc given by Fc=½*m*W*V where m is the cantilever electrode's 204 lateral velocity. The rotational rate can be determined by measuring the Coriolis force, which is directly proportional to the rotation.

The cantilever 204 deflects in the z-axis direction in response to z-axis forces, and modulates a tunneling current between the ridge-emitter 206 and cantilever electrode 204. An analog circuit (not shown) similar to circuit 43 described in FIG. 1 is preferably used to maintain the tunneling current at a constant value. By making the cantilever electrode 204 narrower than the width of the ridge emitter 206 or alternatively by making the width of the ridge emitter 206 wider than the width of the cantilever electrode 204, a continuous tunneling current is maintained even for large amplitudes of the cantilever electrode 204. Thus, the sensitivity of the gyro 202 can be increased.

Preferably, the ridge emitter 206 has been fabricated such that the ridge emitter tip 207 has a radius of curvature of 1000 Angstroms or less. In this embodiment, large lateral amplitudes of the cantilever 204 can be utilized. Because the width of the ridge emitter 206 is wider than a tunneling tip, lateral excursions of the cantilever electrode 204 caused be the lateral vibration created by the control electrodes 94,96 will not result in the loss of the tunneling signal.

Figure 5:
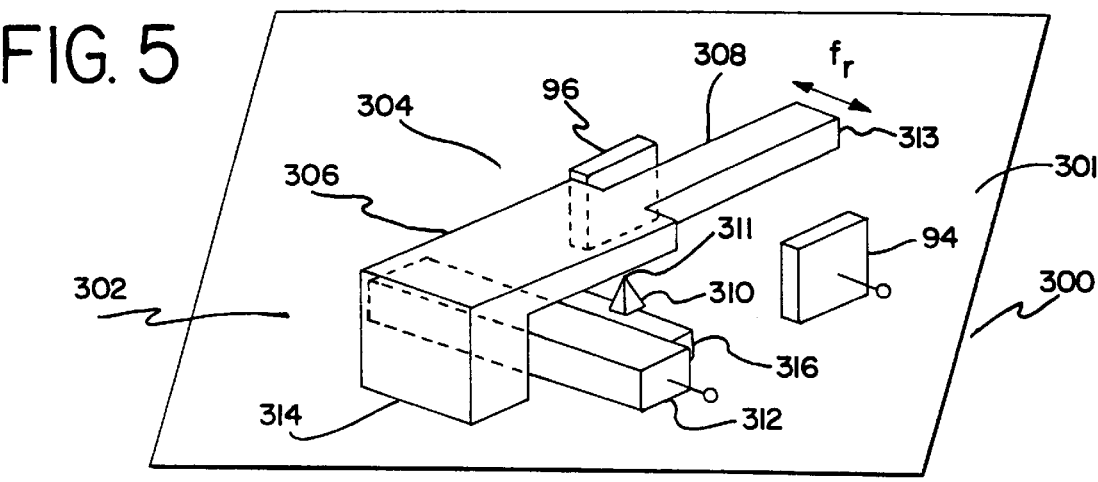
FIG. 5 is a perspective view of a rate-based gyro having non-uniform width.

FIG. 5 is a perspective view of a non-uniform width cantilever rate-based gyro 302. This gyro 302 can be operated by a control circuit similar to that circuit 43 provided in FIG. 1. The sensor 302 is formed on a surface 301 of a semiconductor wafer 300. A cantilever portion 314 extends from the substrate surface 301. The cantilever electrode 304 extends over the surface 301 of the wafer 300 and over a tunneling electrode 310. The cantilever electrode 304 has a narrow portion 308 and a wide portion 306. In this preferred embodiment, the tunneling electrode 310 is a tunneling tip and positioned under the wider portion 306 of the cantilever electrode 304 for maximum sensitivity. A control electrode 312 is formed adjacent to the cantilever portion 314. A test or calibration electrode 316 is also fabricated on the wafer surface 301. The test electrode 316 is located below the cantilever 308 and adjacent the control electrode 312. This test electrode functions similarly as the test electrode 99 described in FIG. 2.

Two lateral control electrodes 94,96 are disposed adjacent the cantilever electrode 308. Lateral control electrodes 94,96 in FIG. 5 are operated in the same fashion as the lateral control electrodes 94,96 described in FIG. 2. These two lateral control electrodes are disposed adjacent the narrower portion 308 of the cantilever electrode 304. As measured in the preferred embodiment Y-shape gyro 82, the non-uniform width gyro 302 measures a Coriolis force Fc given by Fc=½*m*W*V where V is the cantilever electrode's 308 lateral velocity. The rotational rate can be determined by measuring the Coriolis force, which is directly proportional to the rotation.

In this embodiment, lateral accelerations can also produce lateral deflections of the cantilever electrode 308. However, because the tunneling electrode 310 is positioned under the wider portion 306 of the cantilever electrode 304, lateral excursions of the narrower portion 308 of the cantilever electrode 304 will not result in significant motion above the tunneling tip 311. The ratio of widths between the wide portion 306 and narrow portion 308 of the cantilever 304 will determine the lateral motion above the tunneling tip 311 for a given lateral amplitude of the end 313 of the cantilever 304. For all of the disclosed designs, placing additional mass on the cantilever electrode will increase its sensitivity.

Device encapsulation can be accomplished with several packaging designs if needed for environmental control or vacuum operation. In each of the cantilevers disclosed in FIGS. 2 through 5, one end of a cantilever electrode is suspended approximately 1 to 2 microns above the wafer's surface. In an alternative embodiment, the tunneling tip is formed on the underside of cantilever arm instead of on the tunneling electrode. This tunneling tip may be formed by etching a tapered impression with a shape complementary to the desired tip shape. The result is a cantilever electrode with a tunneling tip suspended above the tunneling electrode.

Figure 6:
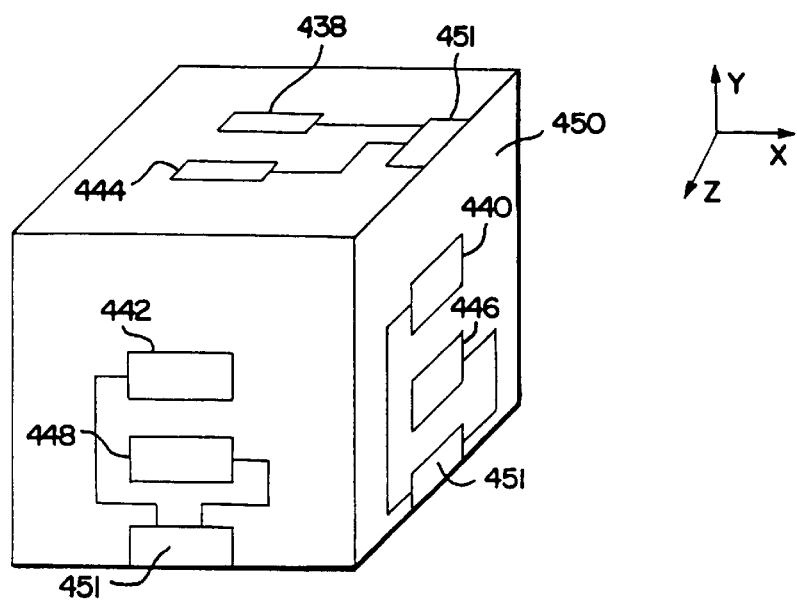
FIG. 6 is a perspective view of a 3-D inertial cube sensor.

FIG. 6 is a perspective view of a 3-D inertial cube 400 that incorporates the z-axis and rotation sensors described previously. Z-axis sensors 438, 440 and 442 and rotation sensors 444, 446 and 448 are fabricated on respective wafers, which are attached to the mutually orthogonal faces of a cube 450 and electrically connected to respective analog feedback circuits 451. The cube senses 3-axis forces and rotations. While a truly cubic structure is shown in FIG. 6, the important features is that the three groups of sensors lie in mutually orthogonal planes. An equivalent orientation can be achieved with other geometric shapes, such as a block in which at least one face is a rectangle. The term "cubic" is used herein as a convenient shorthand to refer to any shape with three mutually orthogonal planes, not just a true cube. Other combinations of x-y-z axis sensors and rotation sensors can be implemented on each orthogonal face.

The described sensor structures have several advantages. Because their structures are extremely simple mechanically, these gyro devices will have a minimal number of eigenmodes around the drive frequencies of interest and have low sensitivity to thermal drifts. By reducing the number of eigenmodes, the number of control loops needed to stabilize the devices against external noise will be reduced. In addition, the manufacturing yields are much higher than with previous complex structures where low yields are common. These less complex devices increase the effective bandwidth of the device (e.g. bandwidths as high as 60–100 kHz are possible), reduce the need for additional control loops to electronically damp unwanted oscillations, provide continuous monitoring of the tunneling current during operation and reduces high frequency "noise" on the signal due to surface roughness of the tunneling counter electrode.

While several illustrative embodiments of the invention have been shown and described, numerous variations and alternative embodiments will occur to those skilled in the art. Such variations and alternate embodiments are contemplated, and can be made without departing from the spirit and scope of the invention as defined by the appended claims.

We claim:

1. A tunneling rotation sensor, comprising:

a substrate;

a cantilever having a first portion, a second portion, and a third portion extending from said substrate and a cantilever arm positioned away from said substrate;

said cantilever arm comprising a first section and a second section;

a tunneling electrode on said substrate;

a tunneling gap through which a current flows, said tunneling gap formed between said tunneling electrode and said first section of said cantilever arm;

said cantilever arm further comprising flexible material and being construed such that:
(a) said first section of said cantilever arm joins with said first portion, said second portion, and said third portion of said cantilever such that said first portion and said third portion make up a cantilever strap;
(b) said cantilever arm deflects toward and away from said substrate; and
(c) said first section is more restricted than said second section from making movements other than said deflection toward and away from said substrate.

2. The tunneling rotation sensor of claim 1, wherein said current flows through said cantilever arm when a voltage is established between said cantilever arm and said tunneling electrode.

3. The tunneling rotation sensor of claim 2, further comprising a first lateral control electrode and a second lateral control electrode both disposed on said substrate adjacent said second section.

4. The tunneling rotation sensor of claim 3, wherein said second section of said cantilever arm oscillates in directions not modifying said deflection when a corresponding voltage is established between said first and second lateral control electrodes and said cantilever arm such that when said sensor is rotated at a rate about an axis defined by said cantilever arm a Coriolis force is exerted on said cantilever arm in proportion to said rate.

* * * * *